United States Patent [19]

McCreery et al.

[11] 4,259,033

[45] Mar. 31, 1981

[54] CUTTING INSERT

[75] Inventors: James F. McCreery, Latrobe, Pa.; Dennis G. Jones, deceased, late of Greensburg, Pa., by Dolores H. Jones, executrix

[73] Assignee: Kennametal Inc., Latrobe, Pa.

[21] Appl. No.: 685,111

[22] Filed: May 10, 1976

Related U.S. Application Data

[63] Continuation of Ser. No. 528,211, Nov. 29, 1974, which is a continuation-in-part of Ser. No. 339,415, Mar. 8, 1973, abandoned.

[51] Int. Cl.³ .............................................. B26D 1/12
[52] U.S. Cl. ................................................... 407/114
[58] Field of Search .............. 29/95, 96, 105 A, 105 R

[56] References Cited

U.S. PATENT DOCUMENTS

| 1,756,516 | 4/1930 | Klopstock | 29/95 |
|---|---|---|---|
| 3,137,917 | 6/1964 | Dowd | 29/95 |
| 3,187,406 | 6/1965 | Franko | 29/95 |
| 3,381,349 | 5/1968 | Newcomer | 29/95 |
| 3,383,748 | 5/1968 | Galimberti et al. | 29/95 R |
| 3,395,434 | 8/1968 | Wirfelt | 29/95 |
| 3,416,209 | 12/1968 | Contrucci et al. | 29/96 |
| 3,733,664 | 5/1973 | McKelvey | 29/95 |
| 3,885,281 | 5/1975 | Stambler | 29/95 R |

FOREIGN PATENT DOCUMENTS

| 1517204 | 2/1968 | France | 29/95 R |
|---|---|---|---|
| 7300644 | 7/1974 | Netherlands | 29/95 R |
| 278611 | 10/1927 | United Kingdom | 29/95 |

OTHER PUBLICATIONS

Contribution to the Cutting and Turning of Metals—by Dr. Ing. H. Klopstock–from Continental Metallurgical and Chemical Engineering of Sep. 1926, beginning on p. 41.
Experiments on the Cutting Angle of Lathe Tools—Japanese Article by Shizud Doi.

*Primary Examiner*—Harrison L. Hinson
*Attorney, Agent, or Firm*—Lawrence R. Burns

[57] ABSTRACT

A cutting insert formed of a hard wear resistant material and having a narrow land area along the cutting edge and an inclined wall leading downwardly and inwardly from the inner edge of the land area and a planar wall extending inwardly from the lower edge of the inclined wall. The insert is free of any rising "chip groove," per se, and is free of any wall spaced inwardly from the cutting edge and serving as a chip breaker or chip controller.

9 Claims, 13 Drawing Figures

CUTTING INSERT

The present application is a continuation of U.S. Ser. No. 528,211, filed Nov. 29, 1974, entitled "Cutting Insert," which was a continuation-in-part of U.S. Ser. No. 339,415, filed Mar. 8, 1973, entitled "Cutting Insert," now abandoned.

RELATED APPLICATIONS

U.S. Ser. No. 673,442, filed Apr. 5, 1976, entitled "CUTTING INSERT".

U.S. Ser. No. 565,808, filed Apr. 7, 1975, entitled "CUTTING INSERT".

U.S. Ser. No. 528,211, filed Nov. 29, 1974, entitled "CUTTING INSERT".

The present invention relates to cutting inserts and is particularly concerned with a novel cutting insert which is simple to mold and which has superior characteristics.

Cutting inserts, heretofore, have usually involved chip breaker or chip control regions in the form of rises formed thereon spaced inwardly from the cutting edge and which are sometimes difficult to mold on the insert and which add to the cost of the insert and which sometimes result in an insert configuration which is difficult to finish machine with respect to the land area adjacent the cutting edge when such machining is required.

Other inserts utilize a separate chip breaker member which is clamped against the insert. Such chip breaker members also involve expense and inconvenience.

Tests and experimentation, however, have revealed that an insert can be formed so as to eliminate the need for rising chip breaker, or chip control, surfaces on the insert or for an extra chip control member, at least for a large class of work.

With the foregoing in mind, a primary object of the present invention is the provision of a cutting insert having improved cutting characteristics and which is relatively simple to mold.

Another object of the present invention is the provision of a cutting insert in which the land area is exposed for any finishing operations it might be desired to carry out thereon.

Another object is the provision of an insert in which complex chip control configurations are eliminated thereby making it simpler to mold the insert and requiring less material in the insert.

Another object is the provision of a broader range of chip control than is obtainable with previous insert designs.

BRIEF SUMMARY OF THE INVENTION

According to the present invention, a molded insert is provided which is made, for example, from a hard wear resistant material such as cemented hard metal carbide, or ceramic, or the like. The insert has parallel top and bottom faces and a peripheral wall extending therebetween. At the juncture of the peripheral wall, with at least one of the top and bottom faces of the insert, there is formed a cutting edge, and extending inwardly of the respective face of the insert from the cutting edge is a relatively narrow land area which might, for example, be only about 0.005 to 0.030 inches in width.

At the inner edge of the land area is a descending wall. This descending wall may incline downwardly in the direction toward the center of the insert, or it may take the form of a large fillet, or an abrupt descent with a small fillet at the bottom.

From the lower edge of this descending wall there is a horizontal wall which may extend completely across the insert parallel to the plane of the respective face, or which may terminate in a more or less abrupt rise near the center of the insert in a region spaced so far from the cutting edge that the rise does not perform any chip controlling function.

The insert according to the present invention, thus, has no rising chip breaker or chip control surface formed thereon, but the chips taken are deflected by the aforementioned descending wall and the horizontal wall.

Further, no extra chip control member needs to be provided for satisfactory operation of the insert.

These and other objects and advantages of the present invention will become more apparent upon reference to the following detailed specification taken in connection with the accompanying drawings in which.

DETAILED DESCRIPTION OF THE INVENTION

Figure 1:
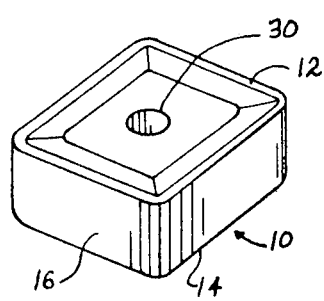
FIG. 1 is a perspective view of an insert according to the present invention.
Figure 2:
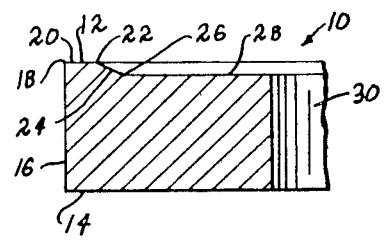
FIG. 2 is a fragmentary sectional view indicated by line II—II on FIG. 1.

Referring to the drawings more in detail, the insert shown in FIGS. 1 and 2 comprises a body generally indicated at 10 and which consists of a top face, or side, 12 and a bottom face, or side, 14 disposed in spaced parallel planes and a peripheral wall 16 extending between the planes of the top and bottom faces.

In FIGS. 1 and 2, wall 16 is perpendicular to the planes of faces 12 and 14. At the juncture of the peripheral wall 16 with the plane of top face 12, there is formed a cutting edge 18 which, in the FIGS. 1 and 2 modification, extends completely around the insert.

Immediately adjacent cutting edge 18 and extending toward the center of body 10 of the insert is a land area 20 which may, for example, be on the order of from 0.005 to 0.030 inches in width. The land area 20, in FIGS. 1 and 2, is perpendicular to peripheral wall 16. The land area may be of substantially uniform width along the entire length of the cutting edge, or it may be more narrow at the corners of the insert for control of chips at light feed rates and depth of cut.

From the inner edge 22 of the land area, there extends downwardly a descending wall 24 which may be inclined toward the center of the body 10 and which may be in the form of a large fillet, or which may be in the form of an abrupt descent with a small fillet at the bottom. In FIGS. 1 and 2, wall 24 is inclined.

This wall is of uniform inclination and extends along the entire length of the land area 20 of the insert. Extending from the lower inner edge 26 of the inclined wall is a horizontal wall 28 parallel to the plane of face 12 of the insert. Wall 28 may extend completely across the upper face of the insert with no rises therein. The insert may or may not comprise a center hole 30 to assist in securing the insert to a holder. As will be seen in the drawings, the plane of wall 28 and the plane of land area 20 and parallel and are spaced apart about the width of the land area. The recess in the insert inside the land area is thus shallow and may be only about 0.001 to about 0.010 inches deep. The best chip control has been observed when the depth of the recess is about 0.005 inches.

Figure 3:
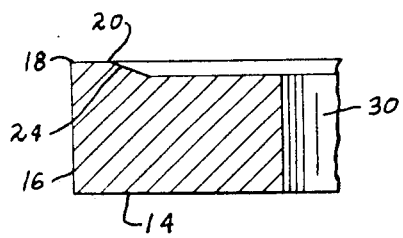
FIG. 3 is a view like FIG. 2 but shows a slightly different configuration of the insert.

The wall 24, when inclined, may be inclined at various angles, for example, from about 13 degrees to the horizontal down to about 30 degrees. FIG. 2 shows wall 24 inclined at about 25 degrees to the horizontal whereas FIG. 3 shows the wall 24 inclined at about 15 degrees to the horizontal. FIG. 3, in other respects, is the same as FIG. 2.

Figure 4:
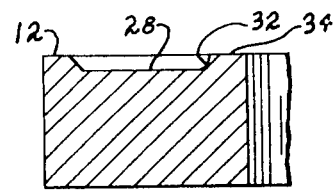
FIG. 4 is a view like FIGS. 2 and 3 but shows still another configuration which the insert can take.

In FIG. 4, the horizontal wall, indicated by numeral 28, terminates in an abrupt rise 32 near the center of the insert leading upwardly to an island area 34 in the plane of the face 12 of the insert. The abrupt rise 32 does not, however, serve as a chip controller because it is spaced from the land area such a distance that the chips do not reach rise 32. Rise 32 merely establishes an island area in the center of an insert which can be useful for clamping the insert in place in a tool holder.

Furthermore, if the insert is made two sided so that there is a cutting edge on each side thereof, the island area can be important for supporting the insert in such a manner that the cutting edge which is facing downwardly in the tool holder is protected from damage.

Two sided inserts without an island area can be supported by a shim which is formed so as not to engage the land area on the underside of the insert.

Figure 5:
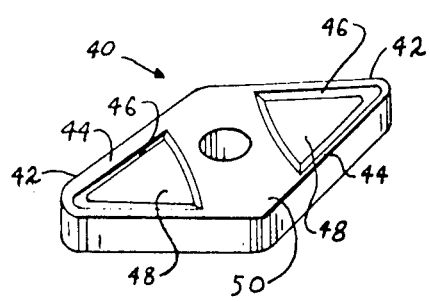
FIG. 5 is another perspective view like FIG. 1 but shows an insert with a central land area thereon.

FIG. 5 shows an insert 40 of parallelogram configuration and which has, extending in both directions from each acute angled corner thereof, cutting edges 42 formed in the same manner as already described in connection with FIGS. 1 and 2. Each cutting edge 42 had adjacent thereto a land area 44 and leading downwardly from the inner edge of the land area 44 is a descending wall 46 and extending from the lower edges of walls 46 is the planar wall 48.

Each planar wall, near the center of the insert, terminates in an abrupt rise to define an island area 50. As before, the abrupt rise, indicated at 42, at the end of the planar wall, does not function as a chip controller, but merely defines the limits of the central island area of the insert.

Figure 6:
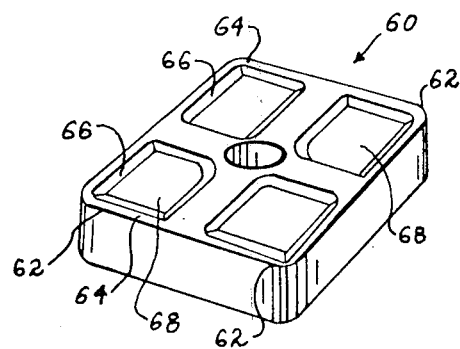
FIG. 6 is a view like FIG. 5 but shows a square insert with a central land area.

FIG. 6 shows a square insert 60 and extending in both directions from each corner thereof are cutting edges 62 each having a land area 64 adjacent thereto and from the inner edge of which there extends downwardly a descending wall 66, and from the bottom of which there extends the planar wall 68 parallel to the plane of the respective face of the insert. Insert 60 in FIG. 6 also has an island area 70 formed thereon and the edges of which are in the form of abrupt rises adjacent the planar surfaces 68 but which do not form chip controllers, but merely define the limits of the island area in the center of the insert.

The length of the cutting edges in FIG. 5 and 6 are generally as long as are normally employed in cutting operations so the island areas provided in these modifications, in normal use, do not represent any departure from the idea of having no rising chip control wall associated with the insert.

Figure 7:
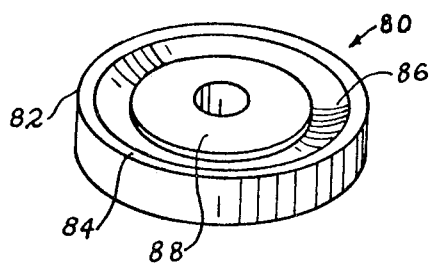
FIG. 7 is a perspective view showing a circular insert.

FIG. 7 shows a circular insert 80 which has a cutting edge 82 extending completely around at least one face thereof with a land area 84 extending inwardly from the cutting edge and a descending wall 86 extending downwardly from the inner edge of the land area. The center part of the face of the insert having the cutting edge thereof is in the form of a planar surface 88 parallel to the face of the insert having the cutting edge thereon.

Planar surface 88 could, if desired, be provided with a central island area with the edge of the island area spaced a substantial distance from the inner edge of the inclined wall so that the edges of the island area would carry out no chip controlling function.

Figure 8:
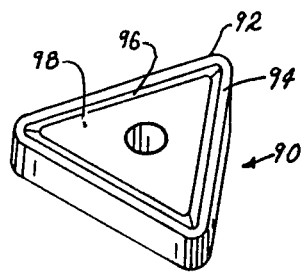
FIG. 8 is a perspective view like FIG. 1 but shows a triangular insert.

FIG. 8 shows an insert 90 which is triangular and which is formed in the same manner as the insert of FIG. 1 with a peripheral cutting edge 92 immediately inwardly of which is a land area 94 and from the inner edge of which there descends a wall 96 which, as has been explained previously, may be a more or less abruptly descending wall or it may be an inclined wall. In any case, at the lower edge of the wall 96, there is a planar area 98 which may or may not be formed with a central island area.

Figure 9:
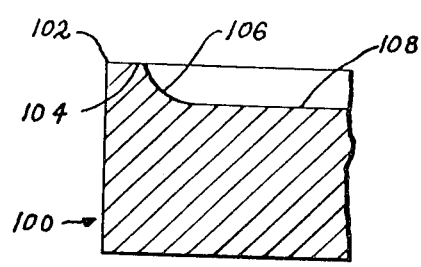
FIG. 9 is a fragmentary sectional view similar to FIG. 2 but shows a different form which the descending wall at the inner edge of the land area can take.

As will be seen in FIG. 9, which is an enlarged fragmentary view of an insert like FIGS. 2 and 3, the insert 100 having a cutting edge 102 adjacent which is a land area 104, may have the descending wall at the inner edge of the land area in the form of a large fillet as indicated at 106 and which leads to the planar wall 108.

Figure 10:
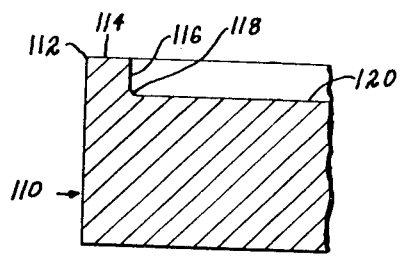
FIG. 10 is a fragmentary view like FIG. 9 showing still a different form which the descending wall can take.

In FIG. 10, insert 110 has a cutting edge 112 and a land area 114 extending inwardly therefrom and the descending wall 116 is, in this case, an abrupt descent with a small fillet 118 at the bottom connecting the abruptly descending wall 116 with planar wall 120.

Figure 11:
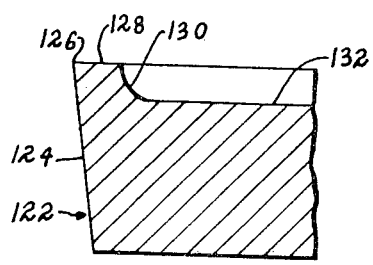
FIG. 11 is a fragmentary sectional view showing an arrangement wherein the peripheral wall inclines inwardly toward the bottom of the insert.

In FIG. 11, insert 122 has an inclined peripheral wall 124 which provides a clearance angle from the workpiece on the front side of the insert, which is to say, the side of the insert facing the work. At the top of inclined wall 124 is a cutting edge 126 and extending inwardly therefrom is a land area 128 and the descending wall 130 is, in this case, in the form of a fillet which blends with planar wall 132 at the bottom of the fillet.

Figure 12:
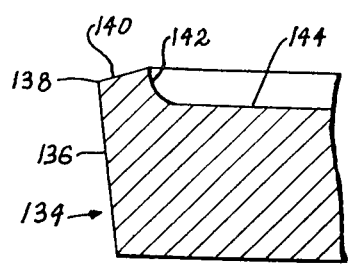
FIG. 12 is a fragmentary sectional view similar to FIG. 11 but showing the land area at the cutting edge inclined at an angle to the plan of the size of the insert on which the cutting edge is formed.

The insert 134 in FIG. 12 has an inclined peripheral wall 136 with a cutting edge 138 at the upper edge thereof and with the land area 140 which extends inwardly from the cutting edge inclined upwardly so as to form an angle of about 90 degrees with peripheral wall 136. The descending wall 142 at the inner edge of the land area 140 is in the form of a fillet which blends with planar wall 144 at the bottom edge of the fillet.

It has been mentioned that the land area advantageously diminishes in width about the corner of the insert when the insert is polygonal and it is also advantageous to modify the descending wall about the corner of the insert. This pertains particularly to inserts in which the descending wall is formed on an incline.

In such inserts, the angle of inclination of the descending wall is uniform along the straight side edges of the insert but increases around the corner of the insert where the land area narrows in width. The combination of the more narrow land area about the corner and the increased angle of inclination to the horizontal of the inclined wall provides the conditions necessary for taking light finishing cuts with the insert while the insert is also adapted for taking heavier cuts due to the reduced inclination of the declining wall along the regions of the cutting edge spaced from the corner of the insert.

Figure 13:
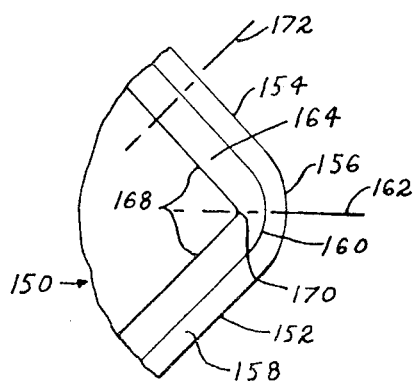
FIG. 13 is a fragmentary enlarged plan view of a corner of a polygonal insert having an inclined wall and showing how the inclined wall is formed more steeply at the corner of the insert than along the side edges.

The insert 150 of FIG. 13 has cutting edges 152 and 154 extending along the edges illustrated and which meet at a corner of the insert and are joined by an arcuate portion 156 swung at a first radius. Adjacent the edges 152 and 154 is the land area 158 which is of uniform width along each of the edges at 152 and 154.

The ends of the inner edge of the inner boundary of the land area is joined at the corner by an arcuate portion 160 which is swung at a smaller radius than arcuate portion 156 and from a different center so that the land area as illustrated diminishes in width around the corner of the insert and is most narrow along dashed line 162.

The descending wall leading from the inner edge of land area 158 is indicated at 164 and intersects the planar wall 166 along lines 168 which extend parallel to cutting edges 152 and 154. Lines 168 approach the corner and are joined by an arcuate portion 170 swung with a still smaller radius and from a different center than the centers from which arcuate portions 156 and 160 are swung.

The inclined wall 164, thus, has a uniform angle of inclination, say, 13 to 30 degrees along the straight edges of the inserts, but increases with regard to the included angle therebetween around the nose or corner of the insert, namely, inside the arcuate portion 160. The angle of inclination of the descending wall might be as much as 10 degrees greater along dashed line 162 than it is along dashed line 172, for example.

The land area may be, for example, 0.010 inches along the cutting edges 152 and 154 and might diminish to as little as 0.005 inches where the land areas is intersected by dashed line 162. Other land area dimensions are possible with the corner region of the land area diminishing in width by as much as 50 percent. Any polygonal insert configured as illustrated in FIG. 13 will satisfactorily make light cuts with suitable chip control and can also take heavier cuts also with suitable chip control.

The insert according to the present invention has been found to operate satisfactorily without the provision of rising chip controlling surfaces and without the use of separate chip controlling members mounted on top of the insert.

The precise reasons why an insert according to the present invention has superior characteristics is not, as yet, understood. However, it is reasoned that the land area sets up a small wedge of the material being machined so that the chip taken actually flows down over the aforementioned wedge. The chip as it flows down and engages the insert engages the inclined wall rearwardly of the land area and takes its curved configuration adjacent the intersection of the downwardly inclined wall with the planar wall extending inwardly toward the center of the insert from the bottom of the downwardly inclined wall.

It has been found that the planar wall must be parallel with the adjacent face of the insert to obtain a proper action. If the surface of the insert is not planar and parallel to the adjacent face of the insert rearwardly from the bottom of the declining wall, the chips do not curl and break properly. The fact that the chips do curl and break properly in the absence of any rising chip breaker surface rearwardly from the cutting edge is a surprising and unexpected result.

Due to the absence of such conventional chip controlling surfaces, the land areas adjacent the cutting edges are exposed for fine finishing operations and, where an island area is absent, such finishing operations can be carried out quite readily because only a minimum amount of material must be removed in order to bring the land area into the desired condition.

The insert according to the present invention can readily be molded and requires less material than an insert in which material must be provided to form a rising chip controller surface.

The material from which the insert can be made includes powdered ceramics, as well as powdered hard metal carbides which are admixed with a powdered cementing metal. Such powdered materials are compacted in a die cavity of the desired shape and the resulting compact is then sintered. Thereafter, not more than minor finishing operations are required to prepare the compact for use.

Modifications may be made within the scope of the appended claims.

What is claimed is:

1. A molded insert for use in removing metal chips from a workpiece and comprising; cutting edge means, a land area, descending wall means and a planar floor means; said insert having a polygonal shape comprising a side edge and a corner when viewed in a direction perpendicular to the plane of said cutting edge means; said cutting edge means having at least two angularly related cutting edges defining a plane substantially parallel to said planar floor means and said cutting edge means extending around at least one corner of said insert; said land area extending inwardly toward the center of said tool from said cutting edge means and at an angle ranging from parallel to 10 degrees of parallel with said planar floor means; and said land area being narrower around the corner of said insert than along the side edges; said descending wall means beginning at the inner edge of said land area and extending inwardly and downwardly at an angle of no less than 15 degrees from a plane parallel with said planar floor means and being inclined to the plane of said cutting edges when viewed in side and making a greater included angle with said plane at said corner of said body than along said side edges thereof; said planar floor means extending inwardly toward the center of said tool from the bottom of said descending wall means; the perpendicular distance from the plane containing said cutting edge means to the planar floor means being in the range of from 0.001 to 0.010 inches and said land area being from 0.005 to 0.030 inches in width, said planar floor being free from a rising chip controlling surface located between the bottom of said descending wall and the center of said planar floor means.

2. A molded insert according to claim 1 in which said insert is formed of a hard wear resistant material, said insert having top and bottom faces and a polygonal peripheral wall extending between said faces and the juncture of said peripheral wall with at least one of said faces forming said cutting edge means, the height of said peripheral surface being less than the width of either of the top and bottom faces.

3. A molded insert according to claim 2 in which said molded insert is polygonal when viewed in a direction perpendicular to said one face and said cutting edge means extends in both directions from at least two opposite corners of the body.

4. A molded insert according to claim 2 in which said molded insert is polygonal when viewed in a direction perpendicular to said one face and said cutting edge means extends in both directions from at least two opposite corners of the body.

5. A molded insert for removing chips from a workpiece and comprising; cutting edge means, a land area, descending wall means and a planar floor means; said insert having a polygonal shape comprising a side edge and a corner when viewed in a direction perpendicular to the plane of said cutting edge means; said cutting edge means having at least two angularly related cutting edges defining a plane substantially parallel to said planar floor means and said cutting edge means extending around at least one corner of said insert; said land area extending inwardly toward the center of said tool from said cutting edge means and at an angle ranging from parallel to 10 degrees from parallel with said planar floor means; and said land area being narrower around the corner of said insert than along the side edges; said descending wall means beginning at the inner edge of said land area and at least the portion thereof which is adjacent said land area extending inwardly and downwardly at an angle of no less than 15 degrees from a plane parallel with said planar floor means and being inclined to the plane of said cutting edges when viewed in side and making a greater included angle with said plane at said corner of said body than along said side edges thereof; said planar floor means extending inwardly toward the center of said tool from the bottom of said descending wall means; the perpendicular distance from the plane containing said cutting edge means to the planar floor means being less than the width of said land area and the inner edge of said land area spaced from the cutting edge means so that a metal chip being removed from the workpiece can travel immediately downwardly from said inner edge and slidingly engage said floor means, said planar floor being free from a rising chip controlling surface located between the bottom of said descending wall and the center of said planar floor means.

6. A molded insert according to claim 5 in which said insert is formed of a hard wear resistant material, said insert having top and bottom faces and a polygonal peripheral wall extending between said faces and the juncture of said peripheral wall with at least one of said faces forming said cutting edge means, the height of said peripheral surface being less than the width of either of the top and bottom faces.

7. A molded insert according to claim 6 comprising a molded insert in which said body is polygonal when viewed in a direction perpendicular to said plane of said cutting edge means, and said cutting edge means extends in both directions from at least two opposite corners of the body.

8. A molded insert for removing metal chips from a workpiece and comprising; cutting edge means, a land area, descending wall means and a planar floor means; said insert having a polygonal shape comprising a side edge and a corner when viewed in a direction perpendicular to the plane of said cutting edge means; said cutting edge means having at least two angularly related cutting edges defining a plane substantially parallel to said planar floor means and said cutting edge means extending around at least one corner of said insert; said land area extending inwardly toward the center of said tool from said cutting edge means and at an angle ranging from parallel to 10 degrees from parallel with said planar floor means; and said land area being narrower around the corner of said insert than along the side edges; said descending wall means beginning at the inner edge of said land area and at least the portion thereof which is adjacent said land area extending inwardly and downwardly at an angle of no less than 15 degrees from a plane parallel with said planar floor means and being inclined to the plane of said cutting edges when viewed in side and making a greater included angle with said plane at said corner of said body than along said side edges thereof; said planar floor means extending inwardly toward the center of said tool from the bottom of said descending wall means; the perpendicular distance from the plane containing said cutting edge means to the planar floor means being in the range of from 0.001 to 0.010 inches and the inner edge of said land area spaced from the cutting edge means so that a metal chip being removed from the workpiece can travel immediately downwardly from said inner edge and slidingly engage the floor means, said planar floor being free from a rising chip controlling surface located between the bottom of said descending wall and the center of said planar floor means.

9. A molded insert according to claim 8 in which said insert is formed of a hard wear resistant material, said insert having top and bottom faces and a polygonal peripheral wall extending between said faces and the juncture of said peripheral wall with at least one of said faces forming said cutting edge means, the height of said peripheral surface being less than the width of either of the top and bottom faces.

* * * * *